US009832479B2

United States Patent
Wang

(10) Patent No.: US 9,832,479 B2
(45) Date of Patent: Nov. 28, 2017

(54) MOTION ESTIMATION APPARATUS AND METHOD FOR MULTIVIEW VIDEO

(71) Applicant: ATI Technologies ULC, Markham (CA)

(72) Inventor: Jiao Wang, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 600 days.

(21) Appl. No.: 14/046,095

(22) Filed: Oct. 4, 2013

(65) Prior Publication Data

US 2015/0098507 A1   Apr. 9, 2015

(51) Int. Cl.
*H04N 7/12* (2006.01)
*H04N 11/02* (2006.01)
*H04N 11/04* (2006.01)
*H04N 19/513* (2014.01)
*H04N 19/597* (2014.01)
*H04N 7/14* (2006.01)
*H04N 21/2365* (2011.01)

(52) U.S. Cl.
CPC ........... *H04N 19/513* (2014.11); *H04N 7/147* (2013.01); *H04N 19/597* (2014.11); *H04N 21/2365* (2013.01)

(58) Field of Classification Search
CPC .... H04N 19/513; H04N 7/147; H04N 19/597; H04N 21/2365
USPC ..................................... 375/240.16
See application file for complete search history.

(56) References Cited

U.S. PATENT DOCUMENTS

| 2012/0050475 | A1* | 3/2012 | Tian | H04N 19/597 348/43 |
| 2012/0189060 | A1* | 7/2012 | Lee | H04N 19/597 375/240.16 |

(Continued)

OTHER PUBLICATIONS

Fast Motion Estimation With Inter-View Motion Vector Prediction for Stereo and Multiview Video Coding; Li-Fu Ding, Pei-Kuei Tsung, Wei-Yin Chen, Shao-Yi Chien, and Liang-Gee Chen; 2008.*

*Primary Examiner* — Jared Walker
(74) *Attorney, Agent, or Firm* — Faegre Baker Daniels LLP

(57) ABSTRACT

A motion estimation apparatus and method (carried out electronically) provides for encoding of multiview video, such as stereoscopic video, by providing motion estimation for pixels in a dependent eye view, using motion vector information from a colocated group of pixels in a base eye view and neighboring pixels to the colocated group of pixels in the base eye view. The method and apparatus encodes a group of pixels in a dependent eye view based on the estimated motion vector information. The method and apparatus may also include obtaining a frame of pixels that includes both base eye view pixels and dependent eye pixels so that, for example, frame compatible format packing can be employed. In one example, estimating the motion vector information for a block of pixels, for example, in a dependent eye view is based on a median value calculation of motion vectors for a block of pixels in a base eye view and motion vectors for neighboring blocks of pixels to the colocated group of pixels in the base eye view. An apparatus and method may include transmitting the encoded dependent eye view and base eye view information to another device and decoding the encoded dependent eye view and base eye view information for display.

14 Claims, 7 Drawing Sheets

(56) References Cited

U.S. PATENT DOCUMENTS

2012/0249735 A1* 10/2012 Tsukagoshi .......... H04N 13/007
                                                    348/43
2012/0269271 A1* 10/2012 Chen ................ H04N 19/00684
                                                    375/240.16
2012/0307907 A1* 12/2012 Joch ..................... H04N 19/56
                                                    375/240.16
2014/0341291 A1* 11/2014 Schwarz ............. H04N 19/597
                                                    375/240.16

* cited by examiner

THE PROCESS OF GENERATING THE 3D STEREO VIDEO IN FRAME COMPATIBLE TOP BOTTOM FORMAT

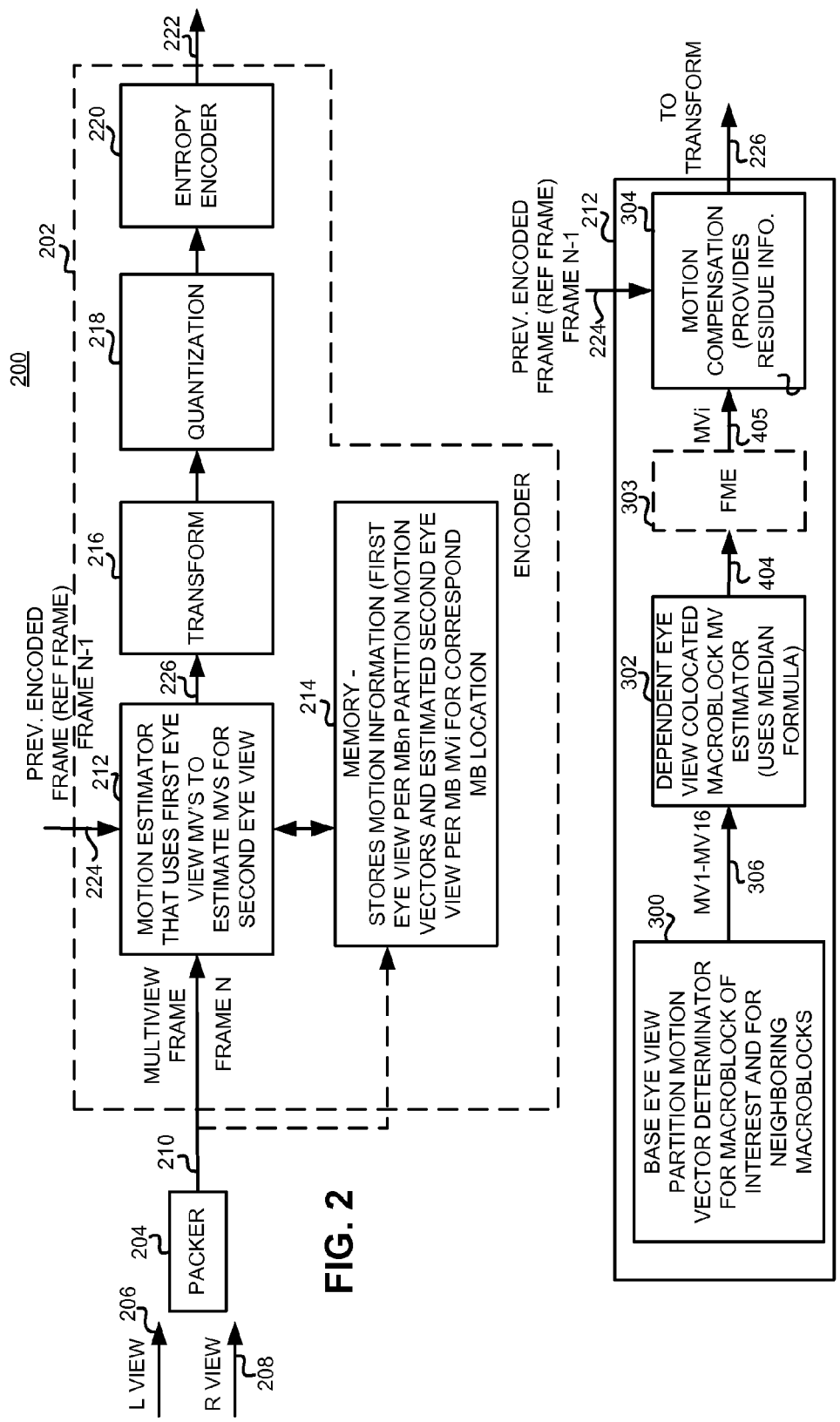

RE-USING THE MOTION VECTOR INFORMATION OF THE TOP AREA (LEFT VIEW)

THE FAST MOTION ESTIMATION METHOD

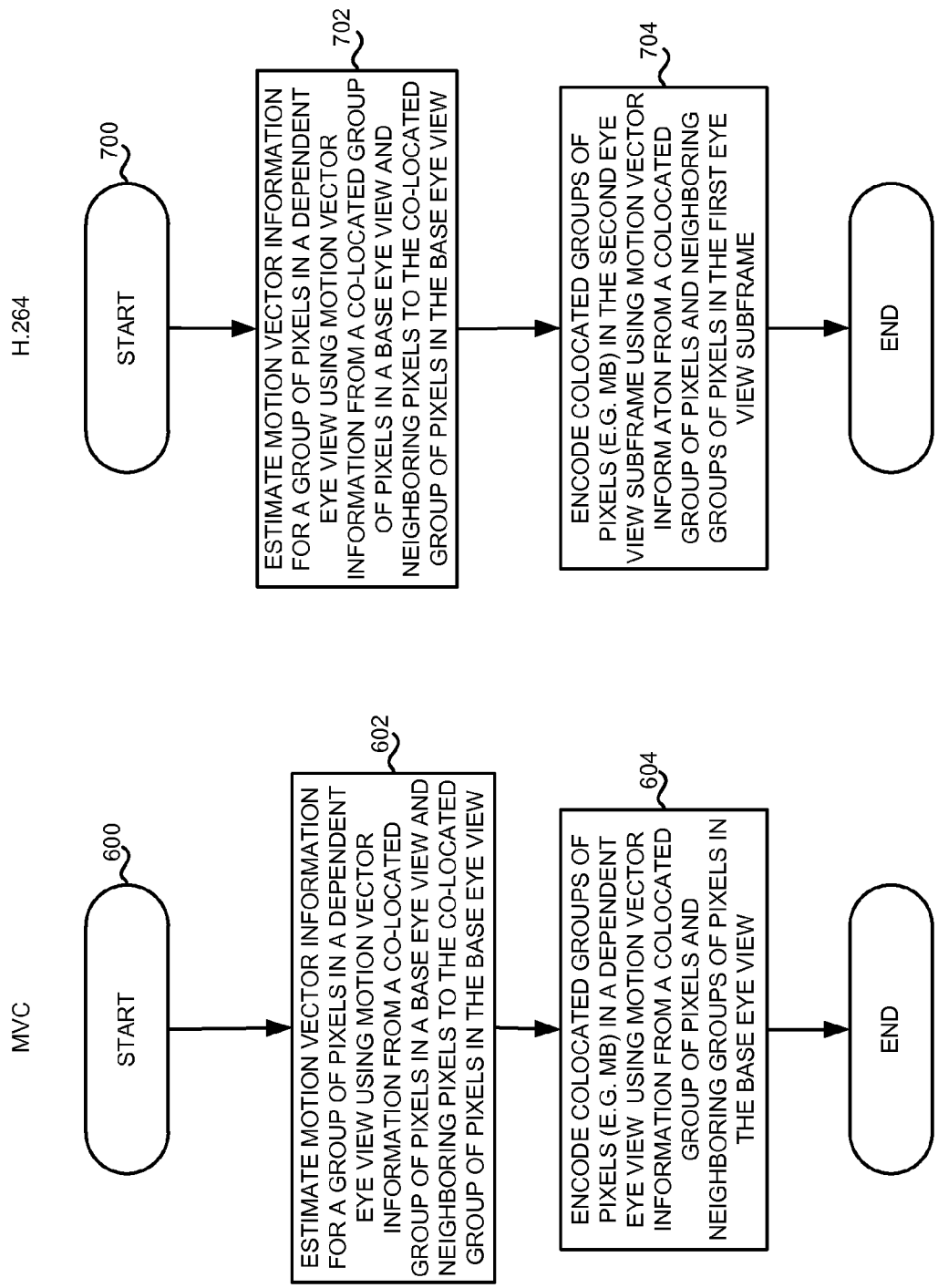

MOTION ESTIMATION APPARATUS AND METHOD FOR MULTIVIEW VIDEO

BACKGROUND OF THE DISCLOSURE

The invention relates generally to multiview or stereoscopic video systems, and more particularly to encoding and decoding techniques for multiview video.

Multiview video is becoming more and more popular. Multiview video is also referred to as stereoscopic video or 3D video. With multiview video, multiple views, such as left eye and right eye views are captured at the same time for the same scene from different angles by, for example, different cameras. There can be more than two views, for example, as well. Given the large data volumes used for 3D distribution, compression and decompression of the stereoscopic video is becoming more important. Video coding standards are known, however, to have deficiencies. For example, the H.264 standard (multiview coding MVC extension) does not specify how an encoder should perform, e.g. how many sets of encoding systems are used, it only explains that the syntax format the output which is generated by the encoder should conform to, in order to ensure that the output data is decodable by an MVC decoder. In order to compress and decompress the stereo video using the existing H.264 encoder and a decoder without a system upgrade to support newer video coding standards (such as, for example, the multiview video coding (MVC) which is a new extension of the H.264/AVC spec under "Annex H Multiview video coding") and to avoid using two sets of encoding and decoding systems for simulcasting the left and right views, it is common to send or transmit multiview video by decimating (downsizing) each view picture (either right eye frame or left eye frame) by half and then packing two views into a single frame. This is known as "frame compatible coding" and is described in greater detail below. The typical packing scheme includes a top and bottom packing format, a left and right packing format or a line interleaved packing format, for example. The packed frames are then treated as normal frames in the encoding process by a conventional encoder. This decimating, encoding and packing can be done by one or more programmed processors, dedicated logic or other image processing circuitry.

Frame compatible format coding allows stereo video to be encoded in the conventional video encoder without any requirement to upgrade an encoding system with higher capability. Accordingly, it has been considerably deployed in stereo 3D video services. As shown in FIG. 1, frame compatible format packs a pair of downscaled stereo views into one single frame. Generally, a left view and right view image are each downscaled to half the vertical resolution in one example. The two downscaled view images are packed together to form a single frame with full resolution and then sent to a video encoder. The motion estimation block in the video encoder takes much of the overall encoding time. In a conventional motion estimation process, an exhaustive search is performed in a reference frame for each macroblock in the current frame to find the best motion vector which results in the lowest rate distortion cost. In order to encode such images, the exhaustive macroblock search can be done on every frame to encode each frame of multiview information. However, such operation can be very time consuming.

An alternative methodology may be to take the motion vector from the top/left half frame as the motion vector for the co-located MB in the bottom/right half frame. This may save more processing cycles for the motion estimation process in a video encoder but taking the motion vector directly from one view and using it for the other view may introduce visual quality degradation.

Accordingly, it would be desirable to have an improved encoding and motion estimation operation for multiview video.

BRIEF DESCRIPTION OF THE DRAWINGS

The embodiments will be more readily understood in view of the following description when accompanied by the below figures and wherein like reference numerals represent like elements, wherein:

FIG. 2 is a block diagram illustrating one example of an encoder in accordance with one aspect described in the disclosure;

FIG. 3 is a block diagram illustrating in more detail the motion estimator of FIG. 2;

FIG. 6 is a flowchart illustrating one example of a method for encoding multiview video in accordance with one example set forth in the disclosure;

FIG. 7 is a flowchart illustrating one example of a method for encoding multiview video in accordance with one example set forth in the disclosure;

DETAILED DESCRIPTION OF THE PREFERRED EMBODIMENTS

Briefly, an apparatus and method (carried out electronically) provides for encoding of multiview video, such as stereoscopic video, by providing motion estimation for pixels in a dependent eye view, using motion vector information from a colocated group of pixels in a base eye view and neighboring pixels to the colocated group of pixels in the base eye view. The method and apparatus encodes a group of pixels in a dependent eye view based on the estimated motion vector information. The method and apparatus may also include obtaining a frame of pixels that includes both base eye view pixels and dependent eye pixels so that, for example, frame compatible format packing can be employed. In one example, estimating the motion vector information for a block of pixels, for example, in a dependent eye view is based on a median value calculation of motion vectors for a block of pixels in a base eye view and motion vectors for neighboring blocks of pixels to the colocated group of pixels in the base eye view. An apparatus and method may include transmitting the encoded dependent eye view and base eye view information to another device and decoding the encoded dependent eye view and base eye view information for display.

Among other advantages, using motion vector information from a base eye view and neighboring pixels in the base eye view to estimate the motion vector information for a block(s) of pixels in a dependent eye view, provide a fast and accurate motion estimation technique to provide efficient encoding for multiview video such as H.264 based encoders, or any other suitable encoders.

Figure 1:
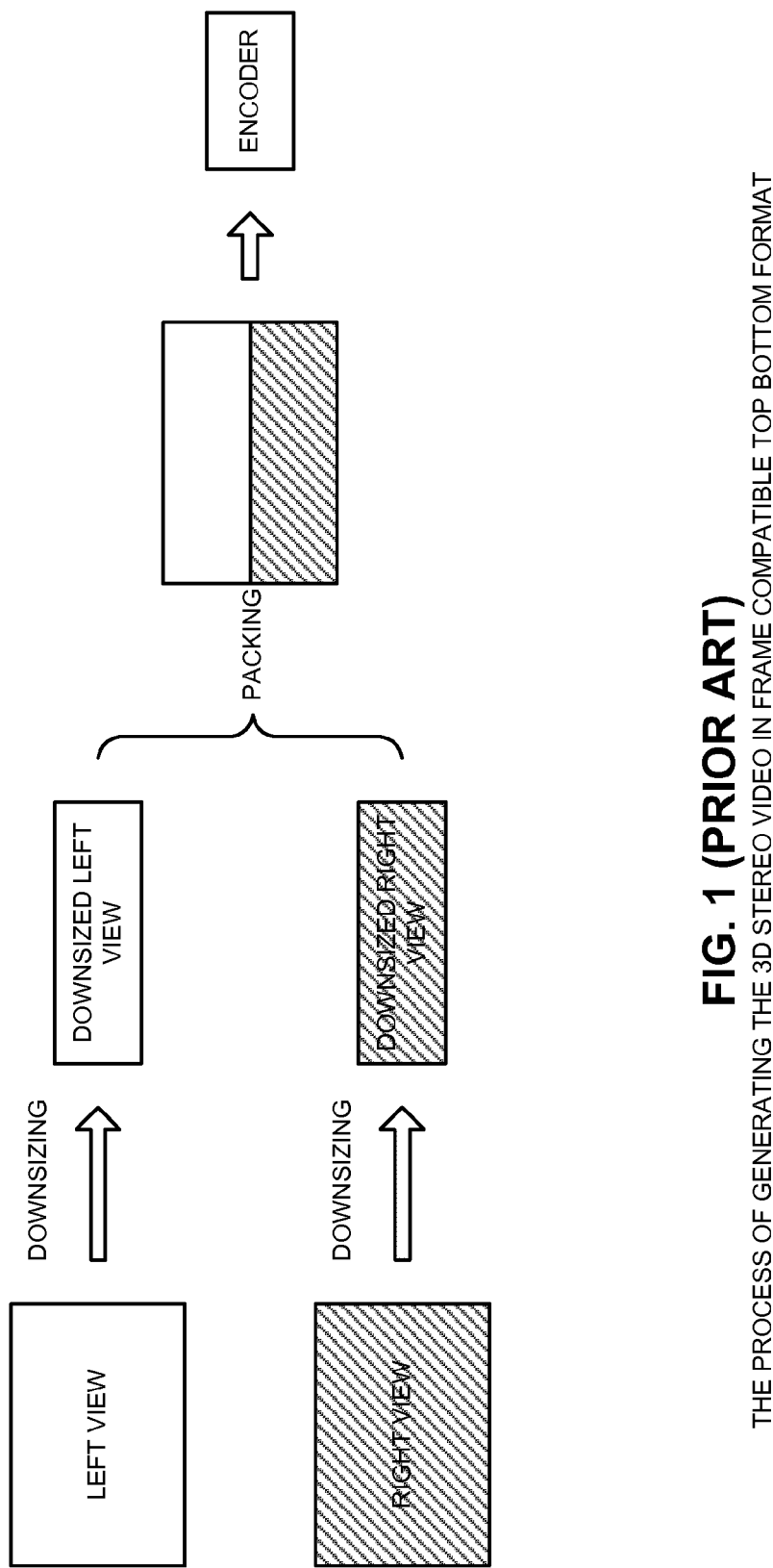
FIG. 1 is a diagram illustrating one example of a prior art process of generating multiview video in a frame compatible format.

FIG. 2 illustrates a portion of an integrated circuit 200, such as but not limited to, a graphics processor (e.g., one or more cores), CPU or other suitable structure that includes a multiview video encoder 202. The integrated circuit may be, for example, a graphics processing circuit, central processing circuit, or any other integrated circuit as desired that includes the multiview video encoder 202. The encoder will be described as an H.264 based encoder, however it can be any suitable type of encoder. A packer circuit 204 obtains multiview pixel information such as left view information 206 and right view information 208 and packs the information into a multiview frame 210 similar to that illustrated in FIG. 1. The multiview video encoder 202 includes a motion estimator circuit 212 that uses the first eye view's motion vectors to estimate the motion vector pixel blocks for a second eye view. The multiview video encoder also includes memory 214 that stores motion information such as the first eye view per macroblock partition motion vectors as well as estimated second eye view per macroblock motion vector information for corresponding macroblock locations. As described, the encoder 202 operates on a macroblock basis. However, any suitable grouping of pixels may be employed. The memory, if desired, may also include executable instructions that when executed cause a processor to function as the motion estimator 212 and other functional blocks of the encoder 202. The memory 214 may be any suitable memory and may be, for example, RAM, ROM, memristor based memory, memory distributed across multiple devices and networks, or any other suitable memory including memristor based memory or any other suitable memory. Alternatively, the motion estimator 212 and other functional blocks may be implemented as discrete logic, state machines, or any suitable combination of hardware and software as desired.

The multiview video encoder 202 also includes conventional video encoding blocks such as a transform block 216, a quantization block 218 and an entropy encoder 220 as known in the art. The output of the encoder 222 is encoded multiview pixel information. The motion estimator 212 also receives as input, a previous encoded frame serving as a reference frame 224. The multiview video encoder 202 estimates motion vector information for a macroblock in a dependent eye view using motion vector information from a colocated macroblock in a base eye view and neighboring macroblocks to the colocated macroblock in the base eye view. The estimated motion vector information is shown as 226. The encoder 202 obtains the frame of pixels 210 that includes both base eye view pixels and dependent eye view pixels from the packer 204, from a frame buffer, or any other suitable source.

Figure 4:
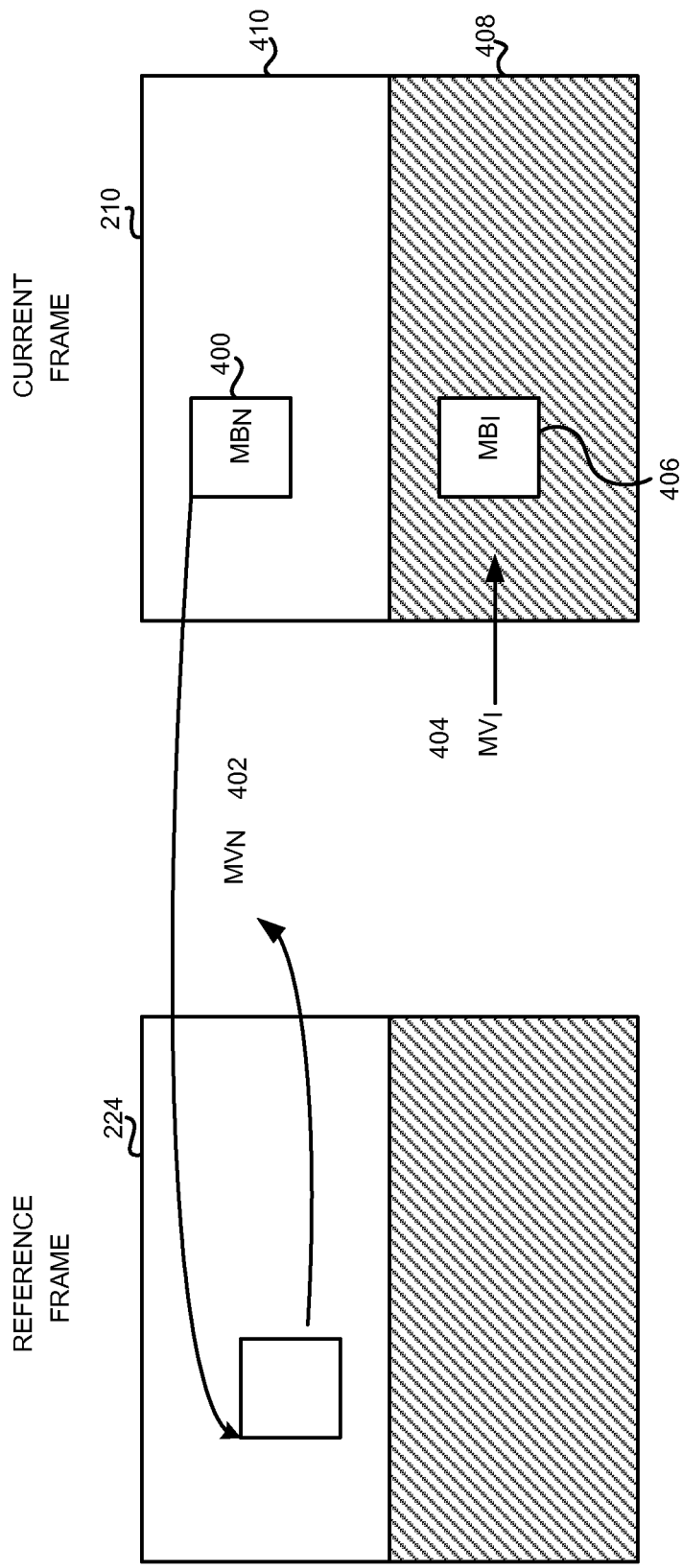
FIG. 4 is a diagram illustrating one example of the use of motion vector information in accordance with one example set forth in the disclosure.
Figure 5:
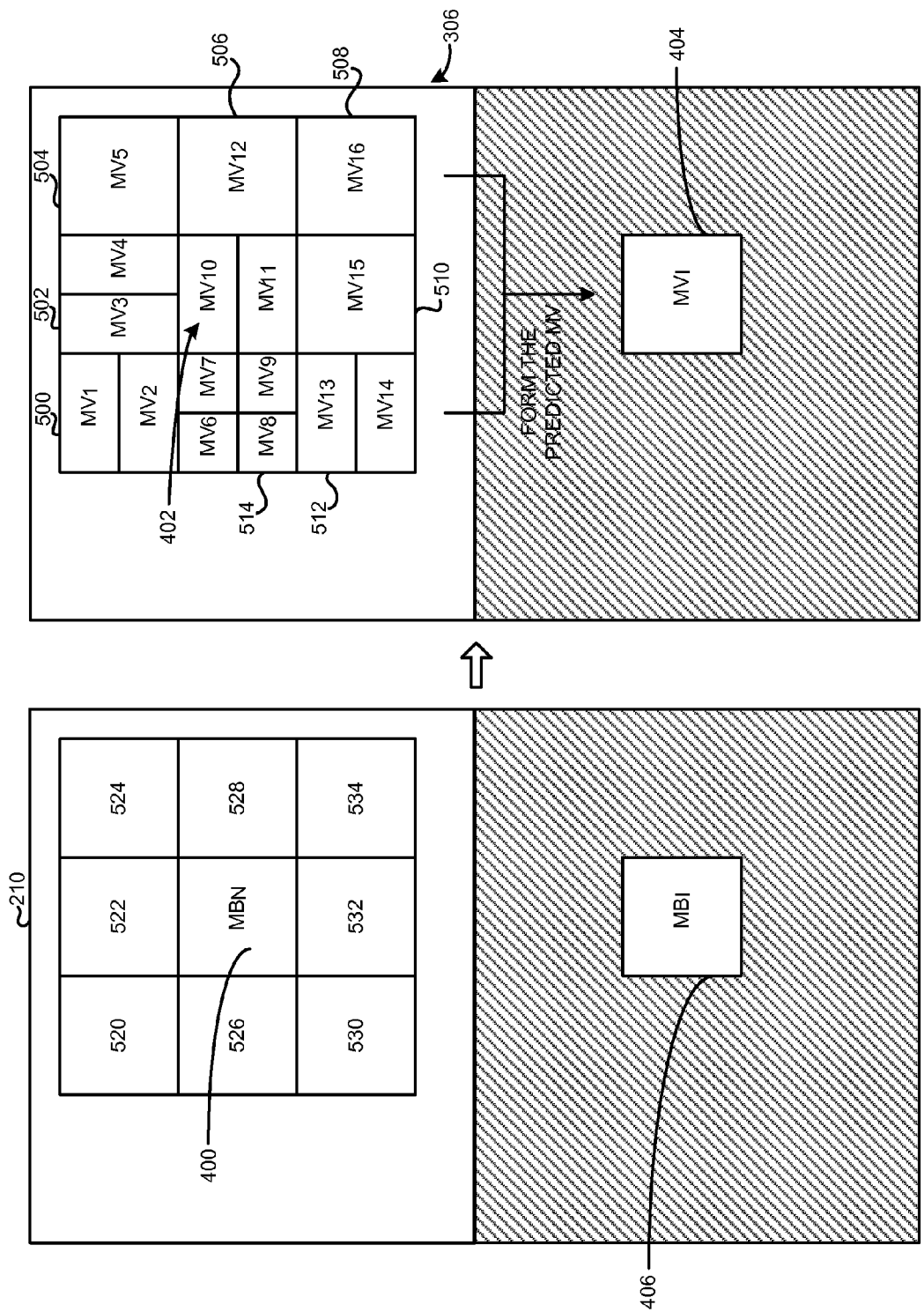
FIG. 5 is a diagram illustrating one example of the use of motion vector information in accordance with one example set forth in the disclosure.

FIG. 3 illustrates in more detail a block diagram of the motion estimator 212. As shown, the motion estimator 212 includes a base eye view partition motion vector determinator 300, a dependent eye view colocated macroblock motion vector estimator 302 and a motion compensation block 304. Referring also to FIGS. 4-6, the operation of the motion estimator 212 will be described. Macroblock 400 ($MB_n$) is one of the macroblocks in the top half area (left view) of the current frame 210. The motion estimator 212 loops over the search area in the reference frame 224 to find the best match for $MB_n$ and finally records its best motion vector information as $MV_n$ 402. The motion vector $MV_n$ 402 is used to predict the motion vector $MV_i$ 404 to be associated with a colocated macroblock $MB_i$ 406 in the bottom half area (right eye view). No exhaustive motion search is needed to find the motion vector $MV_i$ for macroblock $MB_i$. This approach can be applied to all macroblocks in the bottom half area of all intercoded frames (P or B frames). In this example, the dependent eye view is shown as the lower half 408 and the base eye view is shown as 410. As such, the motion vector information $MV_n$ from the left view area 410 is used to predict the motion vector $MV_i$ 404 for the corresponding location of the right view area 408 in the same macroblock location in the same frame without sacrificing quality for future video compression engine blocks including integer motion estimation blocks in current encoders, for example. Other advantages will be recognized by those of ordinary skill in the art. As an example, for the $MB_i$ in the bottom half area of the current frame, the encoder firstly finds its co-located $MB_n$ in the top half area of the same frame. The motion vectors of MBs in the top half area are typically available before doing motion estimation for $MB_i$ in the bottom half area. The encoder takes the motion vector of $MB_n$ and the motion vectors of its surrounding MBs to form a predicted motion vector by using the median method for the $MB_i$ in the bottom half area, in one embodiment, then based on the predicted motion vector a very small range motion refinement is performed in a fractional motion estimation (FME) block 303, as known in the art, to get more accurate motion vectors up to quarter pixel resolution. As such, in one embodiment, the multiview encoder is operative to perform motion refinement to refine the estimated motion vector 404 to produce a fractional motion vector 405 a more accurate location with quarter pel resolution.

As illustrated in FIG. 5, the base eye view partition motion vector determinator 300 determines motion vectors for the $MB_n$ and neighboring MBs. In this example, $MB_n$ is partitioned as 16×8 mode and has two motion vectors, $MV_{10}$ and $MV_{11}$. The MB above and to the left of $MB_n$ is partitioned into 16×8 mode with two motion vectors, $MV_1$ and $MV_2$. The MB above $MB_n$ is in 8×16 mode with two motion vectors $MV_3$ and $MV_4$. The MB above and to the right of $MB_n$ is in 16×16 mode with one motion vector $MV_5$. The MB to the left of $MB_n$ is in 4×4 mode with four motion vectors $MV_6$, $MV_7$, $MV_8$ and $MV_9$. The MB to the right of $MB_n$ is in 16×16 mode with one motion vector $MV_{12}$. The MB below and to the left of $MB_n$ is in 16×8 mode with two motion vectors $MV_{13}$ and $MV_{14}$. The MB below $MB_n$ is in 16×16 mode with one motion vector $MV_{15}$. The MB below and to the right of $MB_n$ is in 16×16 mode with one motion vector $MV_{16}$. This MV information 306 is provided for the dependent eye view colocated MB MV estimator 302. The estimator 302 applies the median value calculation as shown in formula (1) to all of these motion vectors ($MV_1$ to $MV_{16}$) in both the horizontal and vertical components to form a predicted motion vector $MV_i$ for the co-located $MB_i$ in the bottom half area of the current frame.

$$MV_i = \arg\min_{1 \le j \le 16} \sum_{k=1, k \ne j}^{16} \|MV_k - MV_j\| \quad (1)$$

Centered on the generated predicted motion vector $MV_i$ a small range motion refinement is performed to get the final motion vector with higher precision for $MB_i$. The same method can be applied to each MB in the bottom half area of the current frame. This way the exhaustive search can be avoided for the bottom half area of the current frame.

Although FIG. 5 shows an example regarding this fast motion estimation algorithm, in the real case, it could be generalized to include a wider window of neighbors in the top half area of the current frame. The reason that the median method is chosen over the average method to get the predicted motion vector is that the motion trend could become inaccurate by averaging all the motion vectors.

It will be recognized that the illustrated above example uses the case of frame compatible top and bottom format as an example, it can be extended to cover the side by side format, the line interlaced format as well and other formats as well.

For side by side case it means that the two views are downsized horizontally and packed in the left and right format to form one complete frame. The same idea can be used for this case, for each macroblock (or partition) in the right half frame, its motion vector can be predicted from the motion vectors of the co-located macroblocks (or partitions) in the left half frame. So for each right half frame there is no need to perform the full motion search.

For frame compatible 3D videos which pack in the line interleaved format, in which the original two views are vertically decimated and packed into a single frame in the row interleaved format, the encoder can employ picture level frame and field adaptive coding. During the encoding, it encodes the top part first, then the bottom part. So the co-located motion vectors from the top area can be used to predict the motion vector of each macroblock (or partition) in the bottom area.

Besides the application to the frame compatible format, the encoder is also applicable to the MVC case. It can be performed on a frame basis in order to make use of the similarity between the different views. The MVC processes each view frame as an encoding job. The encoder stores the motion estimation result of the left view frame, and use these motion vectors to predict the co-located macroblock (or partition) in the right view frame. This way the exhaustive search can be avoided for all frames of the right view, which speeds up the overall encoding process.

As shown in FIG. 6, the method for encoding a multiview frame format begins in block 600 and as shown as block 602 includes estimating motion vector information 404 for a group of pixels 406 in a dependent eye view 408 using motion vector information $MB_n$ from the colocated group of pixels 400 in a base eye view 410 and neighboring and motion vector information 500-514 of neighboring pixels to the colocated group of pixels 400 as noted above. The neighboring pixels are shown as 520-534 and have corresponding motion vector information 500-514. The estimated motion vector information 404 for $MB_i$ 406 is then used to encode the pixels 406. This is shown in block 604.

Referring to FIG. 7, the same methodology is applied for the H.264 standard, for example, as shown in blocks 700-704, the method begins by estimating the motion vector information except the terminology of the standards is different such that subframes are employed and eye views are employed. However, it will be recognized that these terms are interchangeable as used herein.

The motion compensation block 304 operates to deduct the predicted pixels from the original pixels to get the difference between the two, which is referred to as residue.

Figure 8:
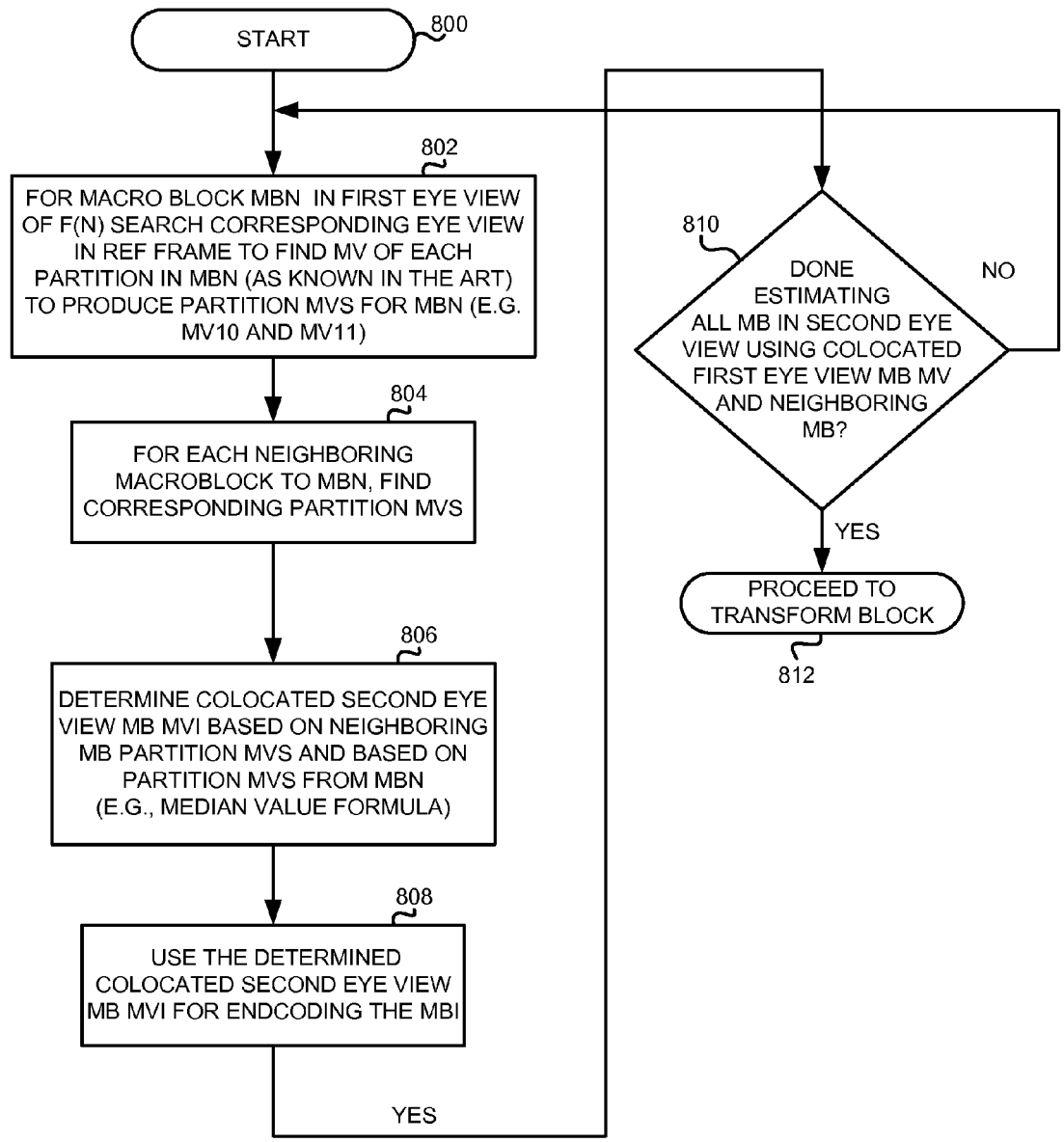
FIG. 8 is a flowchart illustrating one example of a method for encoding multiview video in accordance with one example set forth in the disclosure.

FIG. 8 illustrates in more detail a method for encoding multiview video carried out, for example, by the encoder 212. As shown in block 800, the method begins and as shown in block 802, the method includes for a macroblock $MB_n$ in a first eye view (such as left eye view) of a frame N, search for corresponding eye view in the reference frame to find the motion vector of each partition in a macroblock N, as known in the art, to produce the partition motion vectors for macroblock N. For example, as shown in FIG. 5, the MV 10 and MV 11 are the partitions for the motion vectors for macroblock $MB_n$. As shown in block 804, the method includes for each neighboring macroblock (e.g., adjacent or non-adjacent) to the $MB_n$, the method includes finding the corresponding partition motion vectors for each of the partitions for each neighboring macroblock. As shown in block 806, the method includes determining the colocated second eye view macroblock $MB_i$ based on the neighboring macroblock partition motion vectors and based on the partition motion vectors from $MB_n$. In this example, the median value formula is used to determine the $MB_i$. As shown in block 808, the method includes using the determined colocated second eye view macroblock $MB_i$ for encoding the macroblock I. As shown in block 810, the method includes determining if the motion estimation has been completed for all macroblocks in the second eye view using colocated first eye view macroblock motion vectors and neighboring macroblocks. Depending on whether the encoder pipeline is operating in the unit of macroblock or picture, in the former case the residue data is sent to the transform block right after the motion compensation of one macroblock, and in the latter case the process can wait until the whole picture is completed in the motion compensation process. If so, the estimated motion vectors are provided to the transform block as shown in block 812. If not, the process continues for another macroblock in the first eye view as shown in block 802.

Figure 9:
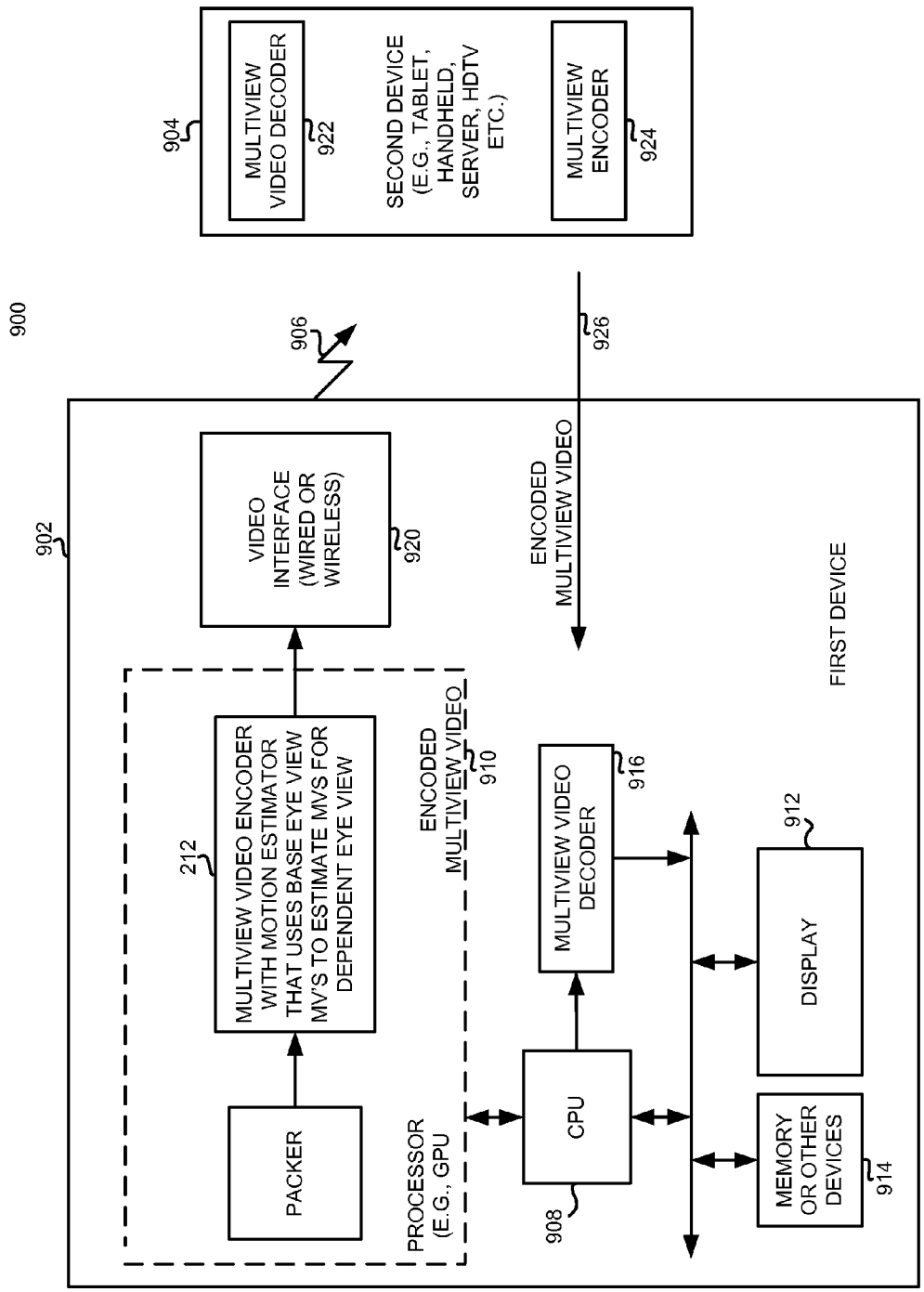
FIG. 9 is a block diagram illustrating one example of a system employing a plurality of devices that provide multiview video encoding in accordance with one example set forth in the disclosure.

FIG. 9 illustrates one example of a system 900 that employs a first device 902 and a second device 904 for communicating encoded multiview video information 906 between the respective devices. The first device may be, for example, a smart phone, tablet device, camera or any other suitable device and may also be, for example, a head end for a video distribution system or any other suitable device. Device 904 may be a smart phone, set top box, server, or any other suitable device that receives the encoded multiview video. In this particular example, the first device includes a first processor 908 such as a CPU (e.g., one or more CPU cores), and a second processor 910 such as a graphics processor (one or more GPU cores on a same or different die from the CPU). As used herein processors may be, for example, respective processing cores in a common integrated circuit or different integrated circuits as desired. In addition, the first device 902 includes a display 912 and memory 914 that can be accessible by the processor 910, CPU 908, or any other suitable component. As also shown in this example, a multiview video decoder 916 may also be included. In this example, the processor 910 includes the multiview video encoder 212 with the motion estimator that uses the base eye view motion vectors to estimate the motion vectors for dependent eye views. Also included in this example is a video interface that may be a wireless interface or wired interface shown as interface 920.

The device 904 may also include one or more processors such as a CPU, GPU, DSP, or any other suitable processors with associated memory display as known in the art and in this example, is shown to include a multiview video decoder 922 and if desired, a multiview encoder 924 of the same type as multiview video encoder 212. In operation, the processor 910 may pack the frames for encoding by multiview encoder 212. The encoded multiview video is encoded as previously described herein, may be wirelessly communicated to the device 904. A multiview video decoder 922 may suitably decode the encoded multiview video using known techniques and display the information on a display on device 904. If device 904 is a server or handheld device or other device that also includes a multiview encoder 924, the multiview encoder 924 employs the operations as described herein with respect to encoder 212 and may wirelessly communicate the encoded multiview video 926 for decoding by multiview video decoder 916 which may be of a type known in the art to decode multiview video that is frame compatible. The decoded information may then be output to display 912. It may be desired that the encoder 212 encodes and stores the encoded information on the first device and the first device at a later point in time may decode it using decoder 916. This diagram is only intended for illustrative purposes and not for purposes of limitation since the multiview video encoder 212 may be incorporated in any suitable device such as a web server, transcoding device, or any other suitable device that employs multiview video encoding.

Among other advantages, using motion vector information from a base eye view and neighboring pixels in the base eye view to estimate the motion vector information for a block(s) of pixels in a dependent eye view, provide a fast and accurate motion estimation technique to provide efficient encoding for multiview video such as H.264 based encoders, or any other suitable encoders.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for encoding multiview video comprising:
   estimating motion vector information for a group of pixels in a dependent eye view using motion vector information from a co-located group of pixels in a base eye view and motion vector information from neighboring pixels to the co-located group of pixels in the base eye view wherein the base eye view and dependent eye views are temporally the same;
   encoding the group of pixels in the dependent eye view based on the estimated motion vector information; and
   wherein estimating the motion vector information for the group of pixels in a dependent eye view is done based on a median value calculation of motion vectors for the co-located group of pixels in a base eye view and motion vectors for the neighboring pixels to the co-located group of pixels in the base eye view.

2. The method of claim 1 comprising obtaining a frame of pixels comprising both base eye view pixels and dependent eye pixels that are used to estimate the motion vector information for the dependent eye view.

3. The method of claim 1 comprising determining motion vector information for groups of dependent eye view pixels and encoding the groups of dependent eye view pixels using the determined motion vector information and transmitting the encoded dependent eye view and base eye view information.

4. The method of claim 3 comprising:
   decoding the transmitted encoded dependent eye view and base eye view information; and
   displaying the decoded dependent eye view and base eye view information.

5. An integrated circuit (IC) comprising:
   a multiview video encoder operative to estimate motion vector information for a group of pixels in a dependent eye view using motion vector information from a co-located group of pixels in a base eye view and neighboring pixels to the co-located group of pixels in the base eye view and wherein the multiview encoder is operative to encode the group of pixels in the dependent eye view based on the estimated motion vector information; and
   wherein the multiview encoder is operative to estimate the motion vector information for the group of pixels in a dependent eye view based on a median value calculation of motion vectors for the co-located group of pixels in a base eye view and motion vectors for the neighboring pixels to the co-located group of pixels in the base eye view.

6. The IC of claim 5 wherein the multiview encoder is operative to obtain a frame of pixels comprising both base eye view pixels and dependent eye pixels.

7. The IC of claim 5 wherein the multiview encoder is comprised of graphic processing circuitry.

8. The IC of claim 5 wherein the multiview encoder is operative to perform motion refinement to refine the estimated motion vector to a more accurate location with quarter pel resolution.

9. An electronic device comprising:
   memory; and
   a multiview video encoder, operatively coupled to the memory, operative to estimate motion vector information for a group of pixels in a dependent eye view using motion vector information from a co-located group of pixels in a base eye view and motion vector information from neighboring pixels to the co-located group of pixels in the base eye view wherein the base eye view and dependent eye views are temporally the same and wherein the multiview encoder is operative to encode the group of pixels in the dependent eye view based on the estimated motion vector information;
   wherein the memory is configured to store the estimated motion vector information; and
   wherein the multiview encoder is operative to estimate the motion vector information for the group of pixels in a dependent eye view based on a median value calculation of motion vectors for the co-located group of pixels in a base eye view and motion vectors for the neighboring pixels to the co-located group of pixels in the base eye view.

10. The electronic device of claim 9 comprising:
    a multiview decoder operative to decode multiview encoded video;
    a display, operatively coupled to the multiview decoder and operative to display decoded multiview video from the multiview decoder.

11. A non-transitory storage medium that comprises executable instructions that when executed by one or more processors cause the one or more processors to:
    estimate motion vector information for a group of pixels in a dependent eye view using motion vector information from a co-located group of pixels in a base eye view and motion vector information from neighboring pixels to the co-located group of pixels in the base eye view wherein the base eye view and dependent eye views are temporally the same;
    encode the group of pixels in the dependent eye view based on the estimated motion vector information; and
    estimate the motion vector information for the group of pixels in a dependent eye view based on a median value calculation of motion vectors for the co-located group of pixels in a base eye view and motion vectors for the neighboring pixels to the co-located group of pixels in the base eye view.

12. The storage medium of claim 11 comprising executable instructions that when executed by one or more processors cause the one or more processors to:
    obtain a frame of pixels comprising both base eye view pixels and dependent eye pixels that are used to estimate the motion vector information for the dependent eye view.

13. The storage medium of claim 11 comprising executable instructions that when executed by one or more processors cause the one or more processors to:
    determine motion vector information for groups of base eye view pixels and encoding the groups of base eye view pixels using the determined motion vector information and transmitting the encoded dependent eye view and base eye view information.

14. The storage medium of claim 11 comprising executable instructions that when executed cause the one or more processors to:
    decode the transmitted encoded dependent eye view and base eye view information; and
    display the decoded dependent eye view and base eye view information.

\* \* \* \* \*